United States Patent
Wieczorek et al.

(10) Patent No.: US 8,538,448 B2
(45) Date of Patent: Sep. 17, 2013

(54) ROUND ROBIN ASSIGNMENT BASED COMMUNICATION SYSTEM

(75) Inventors: Philippe Wieczorek, Saint Ismier (FR); Pierre-Yves Descombes, Annecy-le-vieux (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 31 days.

(21) Appl. No.: 13/418,012

(22) Filed: Mar. 12, 2012

(65) Prior Publication Data
US 2013/0095881 A1  Apr. 18, 2013

(51) Int. Cl.
*H04W 72/00* (2009.01)
*H04L 12/28* (2006.01)

(52) U.S. Cl.
USPC .................................. 455/452.1; 370/395.41

(58) Field of Classification Search
USPC ............... 455/435.1, 435.3, 450, 452.1, 463, 455/464, 500, 512; 370/328, 329, 341, 395.41, 370/395.4, 395.42; 709/224, 225
See application file for complete search history.

(56) References Cited

U.S. PATENT DOCUMENTS

| | | | |
|---|---|---|---|
| 6,393,298 B1 | 5/2002 | Fulton | |
| 7,774,008 B2 | 8/2010 | Benaouda et al. | |
| 2008/0313255 A1 | 12/2008 | Geltner et al. | |
| 2009/0191857 A1* | 7/2009 | Horn et al. | 455/419 |
| 2010/0057485 A1* | 3/2010 | Luft | 705/1 |
| 2011/0053619 A1 | 3/2011 | Shaheen et al. | |
| 2011/0134841 A1* | 6/2011 | Shaheen | 370/328 |
| 2011/0268047 A1* | 11/2011 | Nath et al. | 370/329 |
| 2012/0296968 A1* | 11/2012 | Lin et al. | 709/204 |

FOREIGN PATENT DOCUMENTS

KR  20020046668 A  6/2002

OTHER PUBLICATIONS

EP Search Report ~ dated Mar. 15, 2012 ~ Application No. 11306325.9-1244.

\* cited by examiner

*Primary Examiner* — Sonny Trinh (57) ABSTRACT

A round robin assignment based communication system may include a dynamic subscriber identification module (SIM) provisioning module to obtain and selectively assign a phone number to a device from a predetermined number of devices based on a round robin assignment technique to allow each device to communicate upon assignment of the phone number. A machine-to-machine (M2M) application module may determine priority of the phone number assignment to the devices.

15 Claims, 5 Drawing Sheets

ROUND ROBIN ASSIGNMENT BASED COMMUNICATION SYSTEM

PRIORITY

This application claims priority to European patent application serial number 11306325.9, filed on Oct. 13, 2011, and entitled "Round Robin Assignment Based Communication", which is incorporated by reference in its entirety.

BACKGROUND

Cellular communication involves assignment of a phone number (Mobile Station International Subscriber Directory Number (MSISDN)) to a device, such as a telephone. Such an assignment provides a one-to-one relationship between the device, the phone number and the associated subscriber identification module (SIM) card. For person-to-person communication, such a relationship works well in that people generally talk frequently and for extended periods of times. However, for machine-to-machine (M2M) communication, machines generally talk infrequently and for comparably very short periods of time (i.e. milliseconds). Examples of devices that may use M2M communication may include intelligent cars, communicative GPS, Smart Meters at homes etc. If the same methodology for assignment of phone numbers for person-to-person communication were to be used for M2M communication, the number of available phone numbers would quickly run out. Further, management of phone numbers is not an inexpensive undertaking for communication service providers.

Because of the established cellular infrastructure, many M2M communication devices leverage the existing cellular infrastructure by embedding a SIM card in devices and adding a communication module. Using the existing cellular infrastructure is an efficient way of implementing new services on existing infrastructure, and optimizing the usage and costs associated with such devices. However, with device multiplication, as discussed above, communication service providers are facing the issue of running out of numbers as each device consumes a phone number. This is because the numbering plan in every country allows a finite set of available phone numbers, which will cause near term shortage in most countries. Studies have shown that the shortage may occur within the next two years.

In order to address the potential shortage of phone numbers, cellular concentrators may be used to allow several machines to communicate using a single telephony number. Such concentrators embed the cellular connectivity and provide an alternate communication mechanism to groups of devices by acting as a proxy and gateway. The cellular concentrators however use a different protocol compared to cellular communication. Furthermore, cellular concentrators use an additional communication mechanism, and therefore add components and cost to the communication system. Other solutions that use secondary communication infrastructure also lack the reliability, security, functionality and ubiquitous coverage that cellular provides.

BRIEF DESCRIPTION OF DRAWINGS

The embodiments are described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It is apparent that the embodiments may be practiced without limitation to all the specific details. Also, the embodiments may be used together in various combinations.

1. Overview

A round robin assignment based communication system is described herein and provides for M2M communication using a routable valid phone number that is shared amongst several devices on a round robin basis. The system uses dynamic SIM provisioning to dynamically assign a phone number to different devices. The phone number may be dynamically assigned once during activation (i.e. when a customer purchases a device, there is no pre-assigned number, but when the customer first connects the device to the network, a phone number is assigned). When a device attaches to the network, it communicates with a home location registry (HLR; described below). After security and authentication exchanges, the device may be assigned a unique telephony number. Thus dynamic SIM provisioning may include provisioning of a mobile subscriber integrated services digital network (MSISDN) telephony number for a given mobile device when the device attaches to a network. Dynamic SIM provisioning may include determination of whether a mobile device has attached to a telephony network and allocation of production parameters for this mobile device, including an assigned telephony number (an MSISDN number, for example). The production parameters may be provisioned for the mobile device, at which time the mobile device may be restarted. The mobile device may then be reattached to begin its session on the telephony network. When a determination is made that the mobile device has detached, the telephony number that is assigned to the mobile device may be recycled.

The foregoing round robin assignment technique is suitable for M2M communication because machines in most cases send a few bytes every few minutes (i.e. 15 minutes) or even less depending on the type of application. Some applications may even require a single location update once a day or week. For the system described herein, assigning a number to a device and populating the number through the network may take, for example, two minutes. Depending on the application, this means that a single number may serve approximately 8-700 devices (i.e. for applications respectively updating at 15 minute to weekly intervals). This provides a multiplication factor in terms of the number uses of a single phone number. The system described herein also provides for optimization of network usage, and reduction of costs for communication service providers by factors similar to the foregoing multiplication factor related to the number uses of a single phone number.

As described in further detail below, the round robin assignment based communication system may generally include a dynamic SIM provisioning module that may dynamically assign a phone number to different devices. The phone number may be assigned in a round robin manner. A M2M application module may determine priority of the number assignment. A device which has been assigned a phone number by the dynamic SIM provisioning module may thus receive incoming communication and send outgoing communication as needed.

The system provides for full leverage of existing cellular infrastructure, for example, in terms of authentication, authorization, billing, traceability and functionalities (i.e. roaming, geolocalization etc.). For example, the system makes full use of cellular functionalities, and provides for authorization of communication, billing, traceability etc. Since the system uses fully routable phone numbers, this provides for geolocalization, and roaming (i.e. ability to communicate over cross-country), which is unavailable for non-routable numbers. For example, while a service operator may authorize usage of a non-routable number, during roaming, another service operator may not authorize usage of the non-routable number. The system also leverages existing infrastructure with minimal impact. For example, as described in detail below, the system adds a single node to existing cellular infrastructure, which is the DSM workflow manager node. The system does not change the protocol and the standards used for existing infrastructure. The system also provides for M2M communication at an optimal cost for communication service providers. Furthermore, the system applies to any geography, even in countries that are making full use of all the digits available for building numbering plans.

2. System

Figure 1:
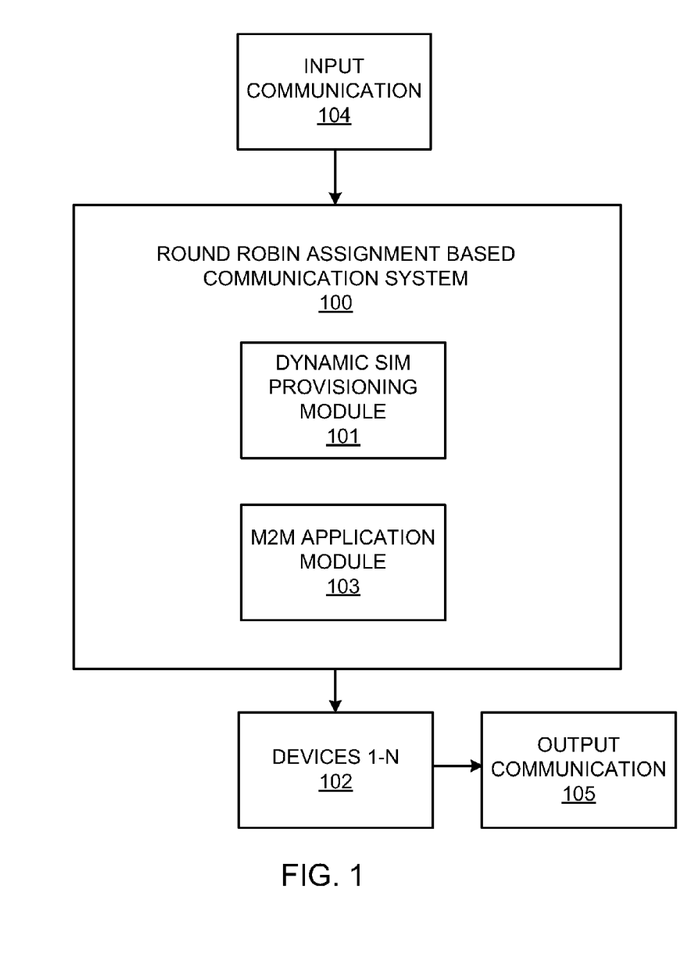
FIG. 1 illustrates a round robin assignment based communication system, according to an embodiment.

FIG. 1 illustrates a round robin assignment based communication system 100, according to an embodiment. The system 100 may include a dynamic SIM provisioning module 101 that may dynamically assign a phone number to different devices (1-n) designated 102. The modules and other components of the system 100 may include machine readable instructions, hardware or a combination of machine readable instructions and hardware. The phone number may be assigned in a round robin manner between the total number of devices n, as described below with reference to FIG. 2. A M2M application module 103 may determine priority of the number assignment. A device 102 which has been assigned a telephone number by the module 101 may thus receive an input communication 104 and send an output communication 105.

Figure 2:
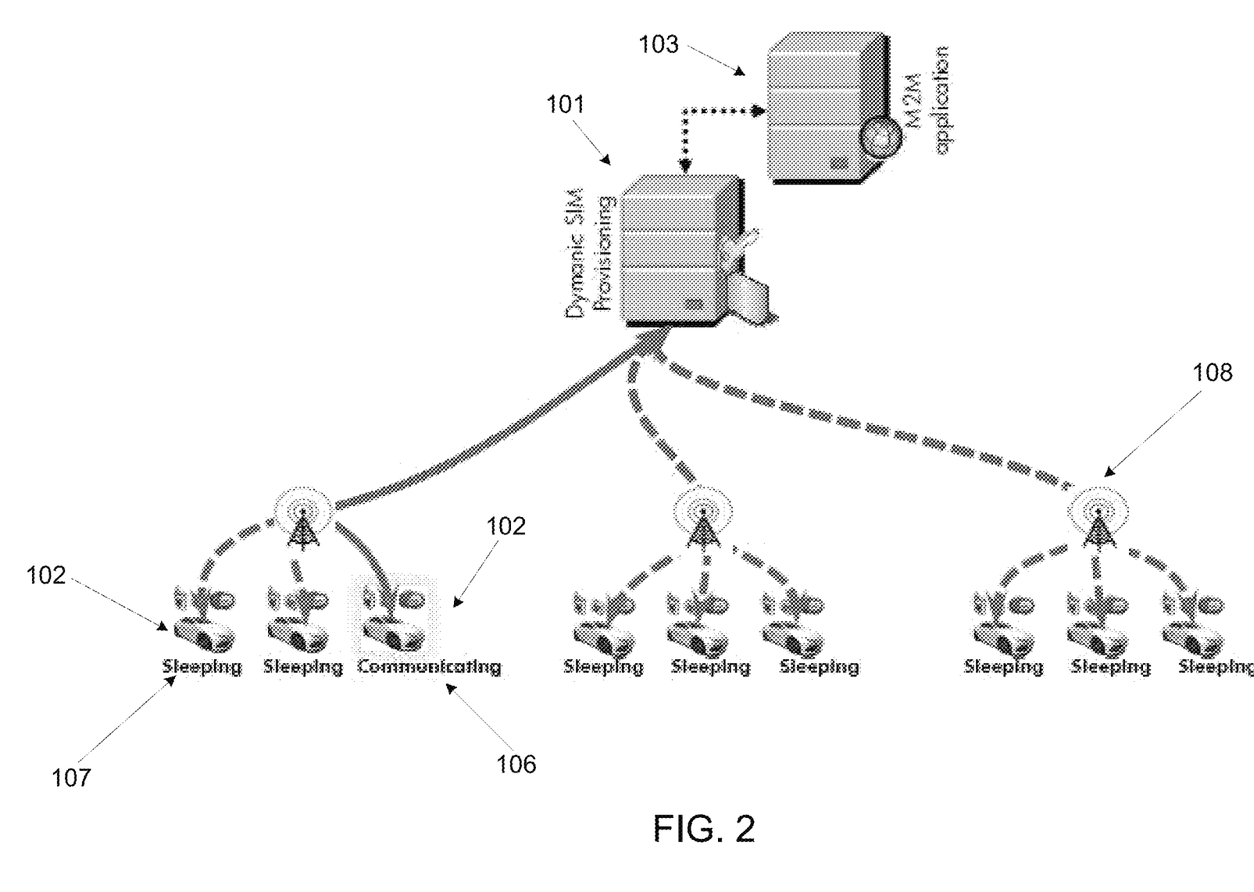
FIG. 2 illustrates functional architecture of the round robin assignment based communication system, according to an embodiment.

Referring to FIG. 2, the dynamic SIM provisioning module 101 may dynamically assign a routable phone number to different devices 102. For example, the devices 102 illustrated in FIG. 2 may be cars that may need to communicate maintenance status type information from time to time. The use of a routable phone number permits incoming and outgoing communication (i.e. input and output communication), as opposed to non-routable numbers that do not permit incoming communication at the outset. As shown in FIG. 2, of the devices 102 assigned to the module 101, device 106 is assigned the routable phone number and may thus communicate as needed. The remaining devices 107 may remain in a sleep mode until they have a need to communicate, at which time the routable phone number may be assigned to them in a round robin manner for communication. For example, for the total devices n (for example, 9 devices illustrated in FIG. 2), the phone number may be assigned to device 106, and thereafter to the remaining devices 102, one at a time, that require communication. The devices may be selected in a random manner from the total number of devices that require communication, at which time they are assigned a priority based on the random assignment. Otherwise, as described below, the priority may be based on the communication needs or urgency of communication of a device, at which time the round robin assignment may be a weighted priority based assignment, with devices requiring urgent communication being placed at a higher priority in the assignment queue. Once the routable phone number is assigned to the device 102, the device may send and receive information as needed. Since propagation of a number between devices typically takes longer than the time for typical communication by a device, the system 100 may allow a device to communication as long as necessary. Once communication is completed, the device may release the number for further assignment to other devices as needed.

Referring to FIG. 2, the M2M application module 103 may include the business logic related to certain communications by a device at any given time. The module 103 may communicate with the module 101 to ascertain and further determine priority of the communication order for the devices. If the business logic provides information to the module 101, for example, regarding a higher priority of a communication, the module 103 may assign a higher priority of the phone number to a particular device based on the communication. For example, if a device (i.e. a car) requires immediate communication, the module 103 may assign a higher priority or otherwise influence the way a number is assigned by influencing the assignment of a number to a particular device. For example, the module may influence the weight allocated to assignment of a number to the particular device requiring the immediate communication. In this manner, the round robin assignment of phone numbers to the devices 102 may effectively be a prioritized round robin assignment based on highest to lowest priority. Thus the round robin assignment of a number to the devices 102 may be an un-weighted or a weighted round robin based on the communication requirements of a device. For devices that do not need to communicate, such devices may not attach to network 108. In this manner, if a number is allocated and no communication is initiated toward or by the device, the module 101 may assign the number to the next device that requires communication without assigning the number to the device that does not require communication.

Figure 3:
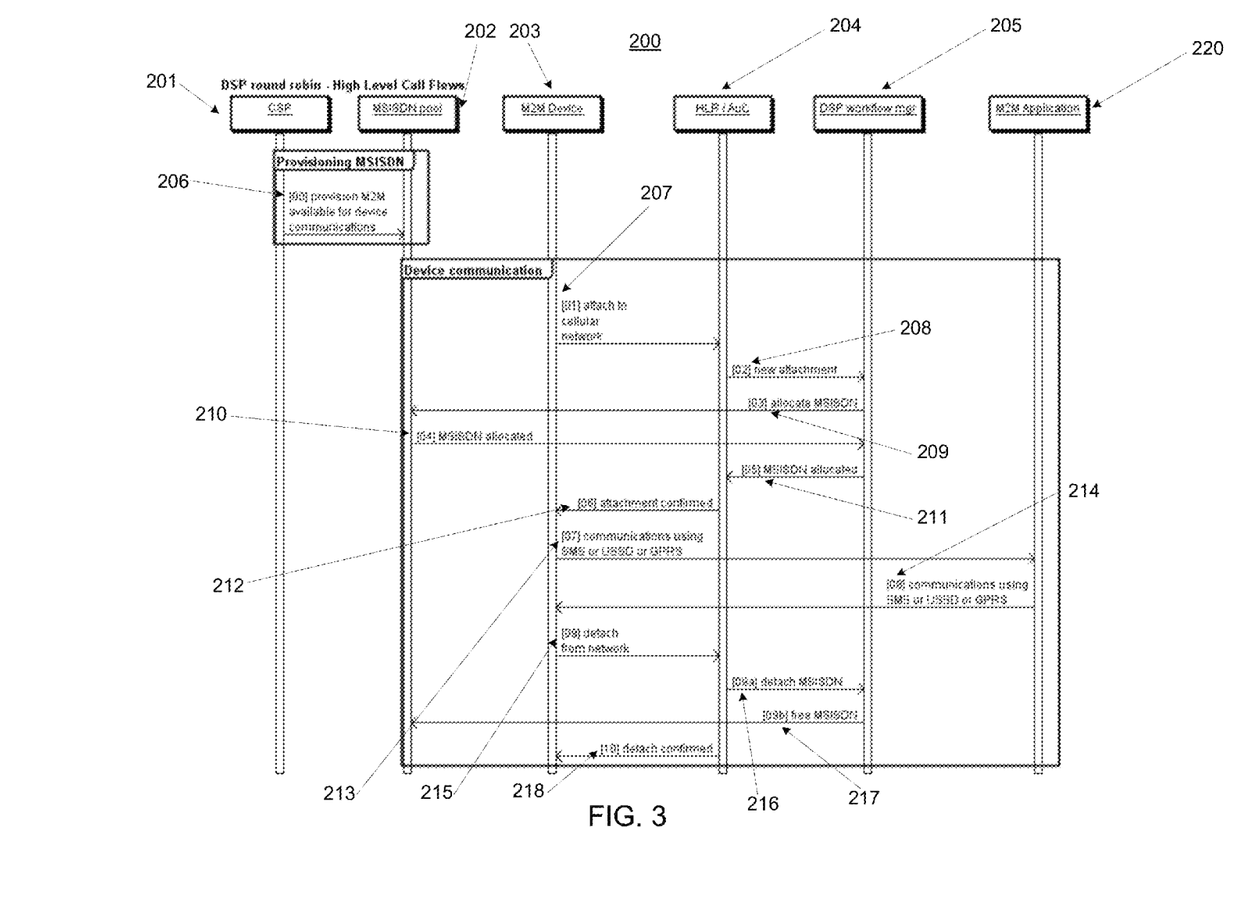
FIG. 3 illustrates a call flow diagram for the round robin assignment based communication system, according to an embodiment.

Referring next to FIG. 3, a call flow diagram 200 for the system 100 is illustrated. The call flow diagram 200 illustrates the high level components for assignment of phone numbers to the devices 102 and communication. The Communication Service Provider (CSP) 201 may be the telecom operator. The CSP 201 may indicate which numbers are available for M2M communication. The MSISDN pool 202 may be the pool of available numbers. The MSISDN pool may include a database that has numbers from, for example, xxx1 to xxxx13, that may be available for communication. The M2M device 203 may be any device (such as devices 102 of FIGS. 1 and 2), such as a car, refrigerator etc., that uses machine to machine communication. The home location registry/authentication centre (HLR/AuC) 204 may be the central database that contains details of each mobile phone subscriber that is authorized to use the Global System for Mobile Communications (GSM) core network, with the AuC being a function to authenticate each SIM card that attempts to connect to the GSM core network. The dynamic SIM provisioning (DSP) workflow manager 205 may be the intelligence of the number allocation, and include similar functionality as the module 101 of FIGS. 1 and 2. The HLR/AuC 204 is the cellular infrastructure that indicates to the DSP workflow manager 205 that there is a new attachment. The M2M Application 220 may be the business logic, and include similar functionality as the module 103 of FIGS. 1 and 2.

In order to obtain, assign and use phone numbers, for the block labeled "Provisioning MSISDN", at block [00] at 206, labeled "[00] provision M2M available for device communications", at this stage the pool of available numbers for communication may be provisioned. Blocks [01]-[10] included in the block labeled "Device communication" and respectively designated 207-218, describe the interaction of the device with the network. At block [01] at 207, labeled "attach to cellular network", at this stage the device may wake up and attach to the cellular network. At the HLR/AuC, the HLR may check to see there are no faults, and other aspects, such as paid subscription etc. At block [02] at 208, labeled "new attachment", at this stage a new attachment request may be indicated to the DSP workflow manager. At block [03] at 209 labeled "allocate MSISDN" and block [04] at 210 labeled "MSISDN allocated", at this stage the DSP workflow manager may reserve a phone number in the pool. The DSP workflow manager may ask the pool component for a phone number, and the pool may return a phone number for use and mark the phone number as currently used. At block [05] at 211 labeled "MSISDN allocated" and block [06] at 212 labeled "attachment confirmed", at this stage the phone number that has been allocated may be given to the HLR and the HLR may confirm the attachment with that phone number to the M2M device. At block [07] at 213 labeled "communications using SMS or USSD or GPRS" and block [08] at 214 also labeled "communications using SMS or USSD or GPRS", at this stage the M2M device is able to communicate with the application as needed. Since the phone number is fully functional, any kind of cellular communication may be used, such as SMS, USSD, GPRS etc. At block [09] at 215 labeled "detach from network", at this stage at some point of time, the device will have completed its communication and then will go back to sleep to preserve power. The device will therefore detach from the network. At block [09a] at 216 labeled "detach MSISDN" and block [09b] at 217 labeled "free MSISDN", at this stage the detach request may go through the HLR, to the DSP workflow manager, which releases the phone number, and indicates to the pool the phone number is available again for communication. At block [10] at 218 labeled "detach confirmed", at this stage the HLR confirms the detachment.

The system 100 thus provides for full leverage of existing cellular infrastructure, for example, in terms of authentication, authorization, billing, traceability and functionalities—including roaming and geolocalization. Since the system uses fully routable phone numbers, this provides for geolocalization, and roaming, which is unavailable for non-routable numbers. The system also leverages existing infrastructure with minimal impact. For example, as described above, the system adds a single node to existing cellular infrastructure, which is the DSM workflow manager node. The system also provides for M2M communication at an optimal cost for communication service providers. Furthermore, the system applies to any geography, even in countries that are making full use of all the digits available for building numbering plans.

3. Method

Figure 4:
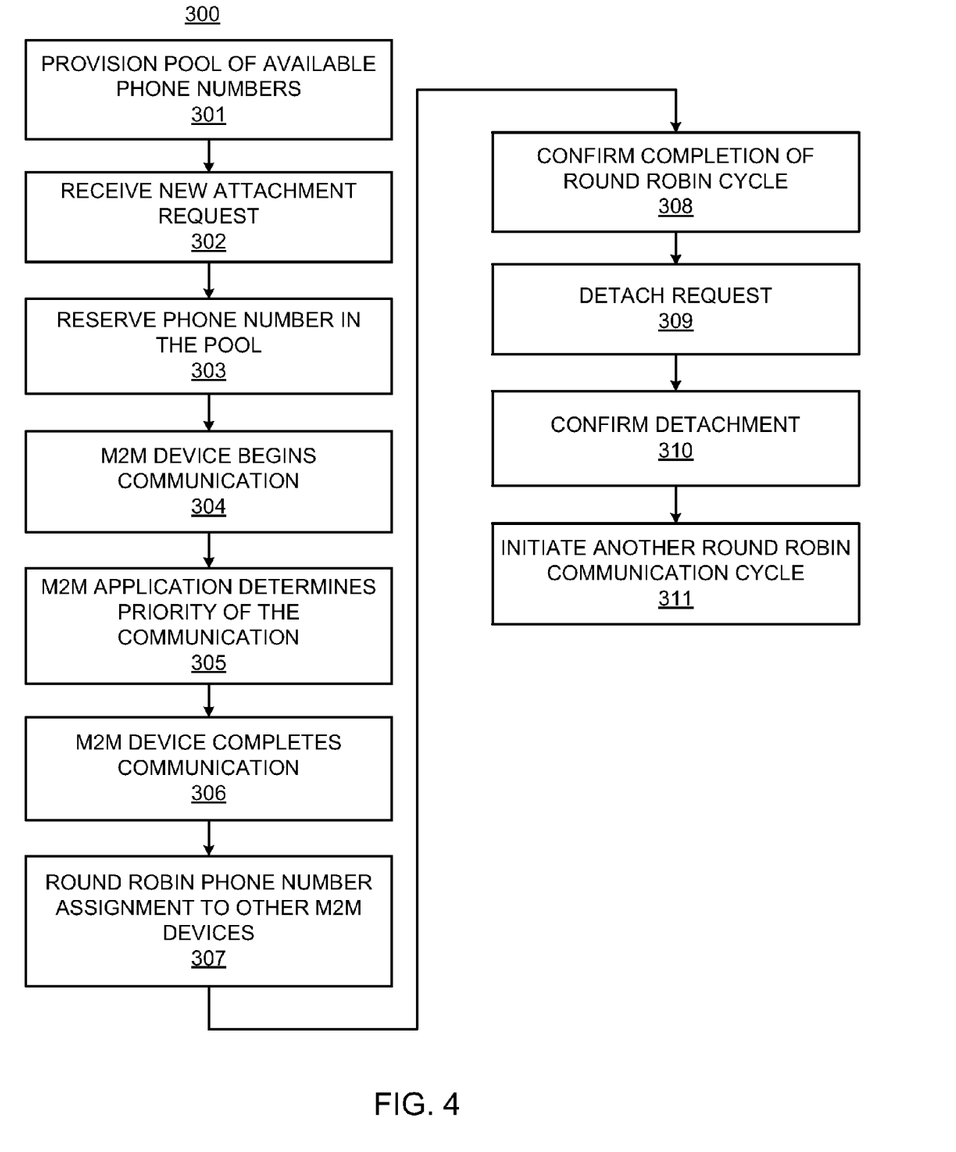
FIG. 4 illustrates a method for round robin assignment based communication, according to an embodiment.

FIG. 4 illustrates a method 300 for round robin assignment based communication, according to an embodiment. The method 300 is described with respect to the round robin assignment based communication system 100 shown in FIGS. 1-3 by way of example and not limitation. The method 300 may be performed by other systems.

Referring to FIG. 4, at block 301, the dynamic SIM provisioning module 101 of the system 100 may provision the pool of available phone numbers for communication. Referring to FIG. 2, the CSP 201 may indicate which phone numbers are available for M2M communication. The MSISDN pool 202 may be the pool of available numbers. As described above, the MSISDN pool may include a database that has phone numbers from, for example, xxx1 to xxxx13, that may be available for communication. The device may then wake up and attach to the cellular network. At the HLR/AuC as shown in FIG. 3, the HLR may check to see there are no faults, and other aspects, such as paid subscription etc.

At block 302, the DSP workflow manager 205 (see FIGS. 3; and 101 in FIGS. 1 and 2) may receive a new attachment request.

At block 303, the DSP workflow manager may reserve a phone number in the pool. The DSP workflow manager may ask the pool component for a phone number, and the pool may return a phone number for use and mark the phone number as currently used. The phone number that has been allocated may be given to the HLR and the HLR may confirm the attachment with that phone number to the M2M device (203 in FIG. 3, 102 in FIGS. 1 and 2).

At block 304, the M2M device is able to communicate as needed. Since the phone number is fully functional, any kind of cellular communication may be used, such as SMS, USSD, GPRS etc.

At block 305, the M2M application 220 (see also module 103 of FIGS. 1 and 2) may communicate with the DSP workflow manager 205 (see also module 101 of FIGS. 1 and 2) to ascertain and further determine priority of the communication order for the M2M devices. If the business logic provides information to the DSP workflow manager 205, for example, regarding a higher priority of a communication, the M2M application 220 may assign a higher priority of the phone number to a particular M2M device based on the communication. For example, if a M2M device (i.e. a car) requires immediate communication, the M2M application 220 may assign a higher priority or otherwise influence the way a number is assigned by influencing the assignment of a number to a particular M2M device. For example, the M2M application 220 may influence the weight allocated to assignment of a number to the particular M2M device requiring the immediate communication. In this manner, the round robin assignment of phone numbers to the M2M devices may effectively be a prioritized round robin assignment based on highest to lowest priority. Thus the round robin assignment of a number to the M2M devices may be an un-weighted or a weighted round robin based on the communication requirements of a M2M device. As shown in FIG. 2, for M2M devices that do not need to communicate, such devices may not attach to the network 108. In this manner, if a number is allocated and no communication is initiated toward or by the M2M device, the DSP workflow manager 205 may assign the number to the next device that requires communication without assigning the number to the device that does not require communication.

At block 306, the M2M device will have completed its communication and may then go back to sleep to preserve power. The M2M device may therefore detach from the network.

At block 307, the DSP workflow manager may assign the phone number per the round robin technique to other devices that require communication.

At block 308, the DSP workflow manager may confirm all devices that require communication have completed communication per the round robin cycle.

At block 309, the detach request may go through the HLR, to the DSP workflow manager, which releases the phone number, and indicates to the pool the phone number is available again for communication.

At block 310, the HLR confirms the detachment.

At block 311, another round robin communication session may be initiated by the M2M device or by the DSP workflow manager.

4. Computer Readable Medium

Figure 5:
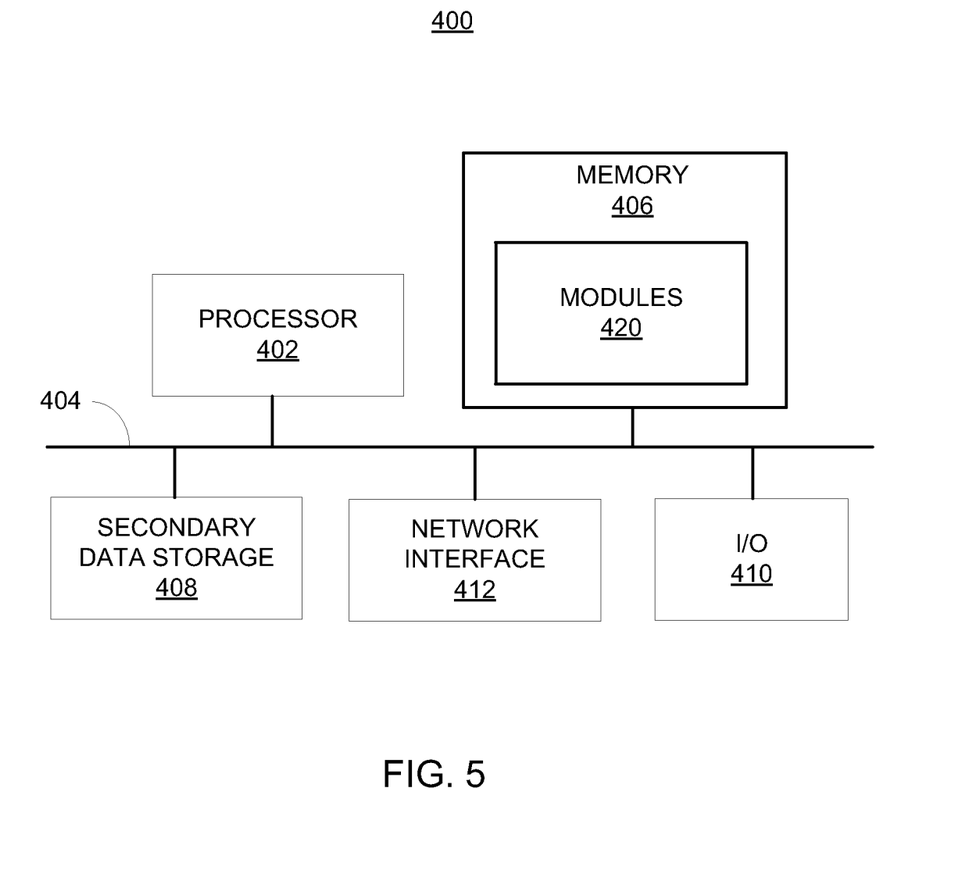
FIG. 5 illustrates a computer system that may be used for the method and system, according to an embodiment.

FIG. 5 shows a computer system 400 that may be used with the embodiments described herein. The computer system 400 represents a generic platform that includes components that may be in a server or another computer system. The computer system 400 may be used as a platform for the system 100. The computer system 400 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 includes a processor 402 that may implement or execute machine readable instructions performing some or all of the methods, functions and other processes described herein. Commands and data from the processor 402 are communicated over a communication bus 404. The computer system 400 also includes a main memory 406, such as a random access memory (RAM), where the machine readable instructions and data for the processor 402 may reside during runtime, and a secondary data storage 408, which may be non-volatile and stores machine readable instructions and data. The memory and data storage are examples of computer readable mediums. The memory 406 may include modules 420 including machine readable instructions residing in the memory 406 during runtime and executed by the processor 402. The modules 420 may include the modules 101 and 103 of the system 100 shown in FIG. 1.

The computer system 400 may include an I/O device 410, such as a keyboard, a mouse, a display, etc. The computer system 400 may include a network interface 412 for connecting to a network. Other known electronic components may be added or substituted in the computer system 400.

While the embodiments have been described with reference to examples, various modifications to the described embodiments may be made without departing from the scope of the claimed embodiments.

What is claimed is:

1. A round robin assignment based communication system comprising:
    a dynamic subscriber identification module (SIM) provisioning module, executed by a processor, to obtain and selectively assign a phone number to a device from a predetermined number of devices based on a round robin assignment technique to allow each device to communicate upon assignment of the phone number; and
    a machine-to-machine (M2M) application module to determine priority of the phone number assignment to the devices.

2. The system of claim 1, wherein the devices communicate based on cellular communication.

3. The system of claim 1, wherein the phone number is a routable phone number.

4. The system of claim 3, wherein use of the routable phone number permits incoming and outgoing communication, respectively, to and from the devices.

5. The system of claim 1, wherein the phone number is assigned to a selected number of the devices that require communication from a total number of the devices that includes devices that do not require communication based on the round robin assignment technique.

6. The system of claim 1, wherein the priority of the phone number assignment is based on business logic related to communications by at least one device.

7. The system of claim 1, wherein the priority of the phone number assignment is weighted according to business logic related to communications by at least one device.

8. The system of claim 1, wherein the round robin assignment technique is based a priority that is one of randomly determined and weighted according to business logic related to communications by at least one device.

9. A method for round robin assignment based communication, the method comprising:
    obtaining and selectively assigning, by a processor, a phone number to a device from a predetermined number of devices based on a round robin assignment technique to allow each device to communicate upon assignment of the phone number; and
    determining priority of the phone number assignment to the devices.

10. The method of claim 9, wherein the devices communicate based on cellular communication.

11. The method of claim 9, wherein the phone number is a routable phone number.

12. The method of claim 9, further comprising assigning the phone number to a selected number of the devices that require communication from a total number of the devices that includes devices that do not require communication based on the round robin assignment technique.

13. The method of claim 9, further comprising basing the priority of the phone number assignment on business logic related to communications by at least one device.

14. The method of claim 9, wherein the priority of the phone number assignment is weighted according to business logic related to communications by at least one device.

15. A non-transitory computer readable medium storing machine readable instructions, that when executed by a computer system, perform a method for database archiving performance benefit determination, the method comprising:
    obtaining and selectively assigning, by a processor, a phone number to a device from a predetermined number of devices based on a round robin assignment technique to allow each device to communicate upon assignment of the phone number; and
    determining priority of the phone number assignment to the devices.

* * * * *

UNITED STATES PATENT AND TRADEMARK OFFICE
CERTIFICATE OF CORRECTION

PATENT NO. : 8,538,448 B2
APPLICATION NO. : 13/418012
DATED : September 17, 2013
INVENTOR(S) : Philippe Wieczorek et al.

Page 1 of 1

It is certified that error appears in the above-identified patent and that said Letters Patent is hereby corrected as shown below:

In the Claims

In column 8, line 21, in Claim 8, delete "based" and insert -- based on --, therefor.

Signed and Sealed this
Nineteenth Day of November, 2013

Teresa Stanek Rea
*Deputy Director of the United States Patent and Trademark Office*